Patented May 4, 1926.

1,583,297

UNITED STATES PATENT OFFICE.

HARRY F. LEWIS, OF BUFFALO, NEW YORK, ASSIGNOR TO NATIONAL ANILINE & CHEMICAL COMPANY, INC., OF NEW YORK, N. Y., A CORPORATION OF NEW YORK.

PURIFICATION OF ANTHRAQUINONE.

No Drawing.   Application filed January 7, 1921.   Serial No. 435,729.

*To all whom it may concern:*

Be it known that I, HARRY F. LEWIS, a citizen of the United States, residing at Buffalo, in the county of Erie, State of New York, have invented certain new and useful Improvements in the Purification of Anthraquinone; and I do hereby declare the following to be a full, clear, and exact description of the invention, such as will enable others skilled in the art to which it appertains to make and use the same.

This invention relates to an improved method or process of purifying anthraquinone to recover the anthraquinone in a purified or pure state from impure products, and particularly from crude anthraquinone obtained from anthracene by oxidation with chromic acid.

In the production of anthraquinone, by oxidizing anthracene with a solution of chromic acid or a solution of an alkali dichromate in an acid, or by nitric acid or the oxides of nitrogen, the product obtained, after dissolving out the constituents which are soluble in water or in the acid solution, is impure, since it contains anthraquinone in admixture with various impurities. The nature and amount of these impurities will vary somewhat with the method of production and also with the type of anthracene used as a starting point in the oxidation; but these impurities may contain varying amounts of the following materials: namely, unchanged anthracene, phenanthrene, diphenic acid, carbazol and its oxidation products, other nitrogenous bases and their oxidation products and certain hydrocarbons such as fluorene, picene, acenaphthene, methyl anthracene, pyrene, chrysene, retene, etc., and their oxidation products. So also, when the anthracene is oxidized to anthraquinone by the chromic acid or dichromate method, the impurities will include oxidation products of the nitrogenous bases which contain chromium as a constituent, especially when carbazol is present in the crude anthracene.

It has been proposed to treat anthraquinone with sodium hydroxide and zinc dust to bring about reduction of the anthraquinone to oxanthranol, and to subject the resulting solution, after filtration, to oxidation with air to separate the anthraquinone; but such proposals have presented certain objections or are available only for operating on a laboratory scale. The present invention relates to certain improvements upon such prior processes, whereby the process becomes available for commercial operations.

According to the present invention, the crude anthraquinone is subjected to the action of caustic alkali (sodium or potassium hydroxide) of certain regulated limits of concentration, and to the action of zinc in a more or less fine state of subdivision, and the reduction of the anthraquinone is carried out at a relatively low and regulated temperature, e. g., around 20° to 40° C., the regulation of the concentration and of the temperature being such that over-reduction is substantially avoided. The reduction of the anthraquinone will also reduce more or less of the impurities so that the resulting solution will contain the reduced anthraquinone together with any reduced or unreduced impurities which are similarly soluble in the alkaline solution. Certain of the impurities, however, will remain insoluble and these latter are separated from the solution, as by filtration, along with the zinc sludge. These insoluble impurities may be recovered from the filter cake and utilized as starting materials in the production of other intermediates and dyestuffs. The filtration of the solution, as heretofore proposed, results in objectionable oxidation and accompanying loss. According to the present invention, this filtration is carried out with steam pressure, or water pressure so that the filtration takes place rapidly and so that the solution is protected against objectionable oxidation.

The alkaline solution of the reduced anthraquinone, after filtration in the manner described, will contain substantially all of the original anthraquinone in a reduced state. This solution is oxidized preferably by means of a current of air, with the resulting precipitation of the purified anthraquinone along with some zinc. The precipitate thus obtained is filtered from the alkaline liquors which contain in solution a considerable amount of impurities of the original anthraquinone or impurities which have undergone reduction. The anthraquinone thus obtained, and which has been purified from most of its impurities is subjected to a further purification by treating with hot dilute alkali solution until no further purification is effected; and the excess alkali is removed by washing with water.

The invention will be further illustrated by the following specific description of the preferred procedure; 100 parts of a crude anthraquinone, obtained by the chromic acid method of oxidation, are added to 1200 parts of a heated 5% caustic soda solution in a vat equipped with an agitator, and 75 parts of zinc dust are added over a period of several minutes, the contents of the vat being kept at a temperature of about 30° C., and agitated at the same time. It is important to avoid too high temperatures, as these tend to bring about objectionable over-reduction. The temperature can be regulated by suitable heating or cooling coils and by the rate of introduction of the zinc dust. The reduction operation is continued under the same conditions of temperature and agitation for a further period of time e. g. 15 to 60 minutes. The zinc sludge, together with the alkali insoluble impurities are removed by filtration, the filtration being promoted by steam pressure which also protects the solution against objectionable oxidation. Any unreduced anthraquinone, as well as the mother liquor, is removed by washing the press cake in the filter press with warm 5% caustic soda solution until the washings are no longer colored red by the reduced anthraquinone. That is, any unreduced anthraquinone will be reduced by the action of the added caustic alkali and the free zinc contained in the sludge so that it will pass into the filtrate and in this way be removed from the sludge. The alkaline filtrate and wash liquor contain the reduced anthraquinone in solution together with such impurities as are soluble in the alkaline solution. This solution is oxidized by contact with air, e. g., by blowing air through it and precipitated anthraquinone is removed by filtration and is treated with a hot dilute alkaline solution and the washing with this solution is continued until there is no further purification to be effected and finally is washed with water alone. For certain types of crude anthraquinone the process can be modified to include an acid wash.

The complete process of purification of the present invention may be considered to involve three successive stages of purification.

In the first stage of the purification, those impurities in the crude anthraquinone, whether or not reduced by the treatment with zinc and caustic soda, which are insoluble in the alkaline media, are left behind on the filter at the end of the first operation; while the anthraquinone, which has been reduced to a form soluble in the alkaline solution, as well as such impurities as are likewise soluble in the sodium hydroxide solution, go into the filtrate. During the filtering operation, as above noted, the solution and precipitate are protected from objectionable oxidation and the filtering operation is promoted by the use of steam pressure. The insoluble impurities which are removed in this operation include the excess zinc, hydrocarbons, alkali insoluble nitrogenous bases, and such oxidation products as are insoluble in alkali, such as unreduced anthraquinone, phenanthraquinone, acenapthaquinone, and some chromium compounds. The filtrate contains the reduced anthraquinone usually together with some phenanthraquinone, acenaphthaquinone, sodium zincate, alkali soluble chromium complexes, and phenolic and carboxylic compounds.

In the second purification operation, the blowing of air through the filtrate containing the reduced anthraquinone in the alkaline solution causes oxidation and precipitation of the anthraquinone together with such impurities as may be present and likewise precipitated through air oxidation, whereas the filtrate will contain such impurities as remain soluble under these conditions. The precipitate may thus contain, in addition to the anthraquinone, a part of the phenanthraquinone, acenaphthaquinone, and zinc salts or lakes of these; while the filtrate contains the phenolic and carboxylic compounds and soluble chromium complexes. The zinc salts of anthraquinone, etc., are insoluble, while the zinc salts of reduced anthraquinone, etc., are soluble.

In the third purification step or stage of the process, the air precipitated anthraquinone is treated with hot dilute alkali with resulting removal of impurities which are insoluble in cold alkali, but soluble in hot alkali.

During the reduction stage of the process, during which the crude anthraquinone is subjected to reduction with the zinc and caustic solution, if the mixture is heated at too high a temperature and for too long a period of time, or if the caustic solution is too strong, there will be formed some reduction products of anthraquinone which are not readily oxidized to anthraquinone by the action of air; and it is therefore important to control the conditions of the reduction so that the anthraquinone will be reduced as completely as possible to a soluble form with substantial avoidance of these more difficulty oxidizable reduction products.

On the other hand, the degree of the reduction operation should be sufficient to reduce substantially all of the anthraquinone to the more easily oxidizable reduction products, and the reduction treatment should be suited to the accomplishment of this result while at the same time avoiding the difficulties above mentioned. The process of the present invention presents the advantage that the reduction is so regulated that practically all of the anthraquinone is reduced to the form of reduction products which are readily oxidized by the action of the air, so that the loss of anthraquinone is minimized and the recoveries of purified anthraquinone are correspondingly high.

So also, the over-reduction of the anthraquinone brings about objectionable reduction of phenanthraquinone, commonly present as an impurity in the crude anthraquinone, whereas, if the reduction is properly regulated, the phenanthraquinone will largely remain behind as an insoluble residue at the end of the reduction treatment.

The avoidance of objectionable loss of anthraquinone during the filtration is further prevented, as above pointed out, by carrying out the filtration of the reduced anthraquinone from the insoluble residue by the use of steam pressure which also promotes the filtering operation. Instead of using steam pressure, water pressure may be similarly used, although less advantageous.

The improved process of the present invention is especially advantageous for the purification of impure anthraquinones produced by the chromic acid or chromate method of oxidation and which contain chromium in a state of combination, as well as oxidation products of nitrogenous bases, such as carbazol, and hydrocarbons such as phenanthrene, acenaphthene, etc., and their oxidation products. That is, the process of the present invention results in the production of a relatively pure anthraquinone from an impure product produced by such process and containing the impurities characteristic of that process, which I have found are removed with particular advantage by treatment in the manner described. The crude anthraquinone can thus be converted into a purified anthraquinone of a high state of purity. Anthraquinone produced by other processes than the chromium oxidation process can, however, be treated with advantage according to the present invention and increased in purity. Furthermore, anthraquinone of widely varying content of impurity, as well as a wide range of impurities, can be converted into a highly purified product by treatment in the manner described.

I claim:

1. The method of purifying anthraquinone, which comprises treating the anthraquinone with zinc and a caustic alkali solution of about 5 percent strength at a temperature of around 20° to 40° C., separating the solution thus formed from the insoluble residue while protecting the solution from oxidation, oxidizing the separated solution to precipitate anthraquinone therefrom, separating the precipitated anthraquinone from the solution, and finally treating the precipitated anthraquinone with alkali to remove alkali soluble impurities.

2. The method of purifying anthraquinone, which comprises treating the anthraquinone with zinc and a solution containing about 5% of caustic soda at a regulated temperature of about 20 to 40° C., separating the solution thus formed from the insoluble residue while protecting the solution from oxidation, oxidizing the separated solution to precipitate anthraquinone therefrom, separating the precipitated anthraquinone from the oxidized solution and treating the precipitated anthraquinone with hot dilute caustic soda solution.

3. The method of purifying anthraquinone, which comprises treating the anthraquinone with zinc and a solution containing about 5% of caustic soda at a temperature of about 30° C., separating the solution thus formed from the insoluble residue, washing the residue with a warm dilute caustic alkali solution, oxidizing the resulting alkaline solution containing the reduced anthraquinone and thereby precipitating the anthraquinone, separating the precipitated anthraquinone from the oxidized solution, and treating the precipitated anthraquinone with dilute alkali.

4. The method of treating anthraquinone, which comprises treating the anthraquinone with zinc and a solution containing about 5% of caustic soda at a temperature of about 20° to 40° C. for about 15 to 20 minutes, separating the resulting solution from the insoluble residue while protecting the solution from oxidation, oxidizing the separated solution to precipitate anthraquinone therefrom, separating the precipitated anthraquinone from the solution and finally treating the precipitated anthraquinone with alkali to remove alkali soluble impurities.

5. The improvement in the method of purifying anthraquinone by reduction with zinc and a dilute caustic alkali solution, which comprises subjecting the alkaline solution of the reduced anthraquinone to filtration with the aid of steam pressure, whereby the solution is protected from oxidation and the filtering operation is promoted.

6. The method of separating anthraquinone from impurities containing chromium in a state of combination, which comprises subjecting the impure anthraquinone containing such impurities to reduction with zinc and a solution of caustic alkali sufficiently dilute to avoid the production of difficultly oxidizable reduction products of anthraquinone, the treatment taking place at a temperature of about 20° to 40° C., separating the resulting solution from the insoluble residue while protecting the solution from oxidation, and subsequently oxidizing the separated solution and treating the precipitated anthraquinone with the dilute alkali.

7. The method of purifying anthraquinone from impurities containing chromium, which comprises subjecting such impure anthraquinone to reduction with zinc and a solution containing about 5% caustic soda at a regulated temperature of about 20 to 40° C., separating the resulting solution from the insoluble residue while protecting the solution from oxidation, oxidizing the resulting solution, and filtering off the anthraquinone and treating it with alkali to remove alkali soluble impurities.

8. In the method of purifying an impure anthraquinone, the steps which comprise subjecting about 100 parts by weight of impure anthraquinone to the reducing action of about 1200 parts by weight of about a 5 per cent caustic soda solution and about 75 parts by weight of zinc dust at a temperature of about 20-40° C., for a period of about 15-60 minutes, separating the solution containing the reduced anthraquinone from the insoluble residue, and subjecting the separated solution to the action of an oxidizing agent to precipitate anthraquinone therefrom.

9. The method of reducing anthraquinone which comprises subjecting anthraquinone to the action of zinc in the presence of about a five per cent solution of caustic alkali at a temperature of about 20° to 40° C.

10. In the reduction of anthraquinone by means of zinc in the presence of a solution of caustic alkali, sufficiently dilute to prevent the formation of considerable amounts of difficultly oxidizable reduction products of anthraquinone the step which comprises causing the reaction to occur at a temperature of about 20° to 40° C.

In testimony whereof I affix my signature.

HARRY F. LEWIS.